(12) United States Patent
Pang et al.

(10) Patent No.: US 12,205,470 B2
(45) Date of Patent: Jan. 21, 2025

(54) VEHICLE CONTROL SYSTEM AND METHOD

(71) Applicants: Tiandi Science & Technology Co., Ltd, Beijing (CN); CCTEG Coal Mining Research Institute, Beijing (CN); CHINA COAL RESEARCH INSTITUTE, Beijing (CN)

(72) Inventors: Yihui Pang, Beijing (CN); Shihua Ren, Beijing (CN); Chen Wang, Beijing (CN); Dezhi Zheng, Beijing (CN)

(73) Assignees: TIANDI SCIENCE & TECHNOLOGY CO., LTD, Beijing (CN); CCTEG COAL MINING RESEARCH INSTITUTE, Beijing (CN); CHINA COAL RESEARCH INSTITUTE, Beijing (CN)

( * ) Notice: Subject to any disclaimer, the term of this patent is extended or adjusted under 35 U.S.C. 154(b) by 410 days.

(21) Appl. No.: 17/842,403

(22) Filed: Jun. 16, 2022

(65) Prior Publication Data

US 2023/0215275 A1  Jul. 6, 2023

(30) Foreign Application Priority Data

Jan. 5, 2022 (CN) .......................... 202210007086.5

(51) Int. Cl.
*G08G 1/00* (2006.01)
*B64U 10/13* (2023.01)
(Continued)

(52) U.S. Cl.
CPC ............. *G08G 1/202* (2013.01); *B64U 10/13* (2023.01); *G01S 17/08* (2013.01); *G06V 20/54* (2022.01);
(Continued)

(58) Field of Classification Search
CPC ............ G08G 1/202; G08G 1/096725; G08G 1/096775; G08G 1/096783;
(Continued)

(56) References Cited

U.S. PATENT DOCUMENTS 9,274,525 B1 * 3/2016 Ferguson ............... B60W 10/18
9,612,123 B1 * 4/2017 Levinson ............... B60Q 1/508
(Continued)

FOREIGN PATENT DOCUMENTS

CN  214151498 U  9/2021

OTHER PUBLICATIONS

CNIPA, First Office Action for CN Application No. 202210007086.5, Sep. 28, 2023.

*Primary Examiner* — Yazan A Soofi
(74) *Attorney, Agent, or Firm* — Hodgson Russ LLP

(57) ABSTRACT

A vehicle control system includes: an on-board control module, configured to control driving of the vehicle according to a control instruction sent by a vehicle dispatching command platform; a vehicle state module, configured to collect state information of the vehicle; an environment sensing module, configured to collect first road environment information of the vehicle; a UAV scanning module, configured to collect second road environment information of the vehicle; a data center module, configured to generate fusion information according to the state information, the first road environment information, and the second road environment information; a map module, configured to generate a driving route map of the vehicle according to the fusion information; and a vehicle dispatching command (Continued)

platform, configured to generate the control instruction according to the fusion information and the driving route map.

10 Claims, 5 Drawing Sheets

(51) Int. Cl.
  *B64U 101/30* (2023.01)
  *G01S 17/08* (2006.01)
  *G06V 20/54* (2022.01)
  *G08G 1/0967* (2006.01)
  *G08G 1/0968* (2006.01)
  *G08G 1/16* (2006.01)
  *H04W 4/46* (2018.01)

(52) U.S. Cl.
  CPC . *G08G 1/096725* (2013.01); *G08G 1/096775* (2013.01); *G08G 1/096783* (2013.01); *G08G 1/096791* (2013.01); *G08G 1/096844* (2013.01); *G08G 1/164* (2013.01); *G08G 1/166* (2013.01); *H04W 4/46* (2018.02); *B64U 2101/30* (2023.01); *B64U 2201/10* (2023.01)

(58) Field of Classification Search
  CPC ... G08G 1/096791; H04W 4/46; G06V 20/54; G01S 17/08
  USPC .......................................................... 701/117
  See application file for complete search history.

(56) References Cited

U.S. PATENT DOCUMENTS

| | | | | |
|---|---|---|---|---|
| 10,175,697 | B1* | 1/2019 | Sachdeva | H04N 13/361 |
| 10,401,852 | B2* | 9/2019 | Levinson | G08G 1/202 |
| 11,738,741 | B2* | 8/2023 | Shalev-Shwartz | B60W 50/0097 |
| | | | | 701/301 |
| 11,769,412 | B2* | 9/2023 | Kang | G01S 13/726 |
| | | | | 340/435 |
| 2017/0116485 | A1* | 4/2017 | Mullen | G08G 1/09626 |
| 2017/0248963 | A1* | 8/2017 | Levinson | G05D 1/0274 |
| 2019/0340921 | A1* | 11/2019 | Ran | G08G 1/07 |
| 2019/0392712 | A1* | 12/2019 | Ran | G08G 1/0116 |
| 2020/0020227 | A1* | 1/2020 | Ran | G08G 1/075 |
| 2020/0090511 | A1* | 3/2020 | Tao | B60W 30/0956 |
| 2020/0184233 | A1* | 6/2020 | Berberian | G06V 20/588 |
| 2020/0353863 | A1* | 11/2020 | Weksler | B60W 50/14 |
| 2021/0065547 | A1* | 3/2021 | Ran | G08G 1/164 |
| 2021/0233396 | A1* | 7/2021 | Guo | G08G 1/0133 |
| 2021/0390860 | A1* | 12/2021 | Kang | G01S 7/539 |
| 2022/0055660 | A1* | 2/2022 | Bälter | G08G 1/165 |
| 2022/0066440 | A1* | 3/2022 | Sucan | G05D 1/0016 |
| 2022/0073097 | A1* | 3/2022 | Sucan | G05D 1/0022 |
| 2022/0111858 | A1* | 4/2022 | Ran | H04L 67/12 |
| 2022/0114885 | A1* | 4/2022 | Ran | B60W 40/04 |
| 2022/0406178 | A1* | 12/2022 | Ran | G08G 1/096708 |
| 2023/0130814 | A1* | 4/2023 | Nister | G06N 3/045 |
| | | | | 701/23 |
| 2023/0406336 | A1* | 12/2023 | Tang | G08G 1/0112 |

\* cited by examiner

VEHICLE CONTROL SYSTEM AND METHOD

CROSS-REFERENCE TO RELATED APPLICATION

The present disclosure claims priority to Chinese Application No. 202210007086.5, filed on Jan. 5, 2022, the entire contents of which is incorporated by reference herein.

TECHNICAL FIELD

The present disclosure relates to the technical field of automatic driving, and particularly to a vehicle control system and method.

BACKGROUND

At present, the automatic driving technology is gradually applied in mines. A mine is a closed area, and the vehicle transportation route is generally a fixed route. The automatic driving of vehicles on the fixed route in the mine area is realized by installing various types of sensor modules, such as environmental sensing, accurate positioning, path planning, and high-speed network transmission and data processing modules on each transportation vehicle.

However, each vehicle needs to be installed with a large number of sensors, receivers and control modules, it also needs accordingly to receive all kinds of perception information and related control information of each vehicle. Also, once the number of vehicles is increased, the vehicles need to be vastly modified, resulting in many problems, such as a variety of fault points, difficult maintenance, complex technology and high cost.

SUMMARY

According to a first aspect of embodiments of the present disclosure, there is provides a vehicle control system, including: an on-board control module and a vehicle state module arranged on the vehicle, an environment sensing module arranged on both sides of the road, an unmanned aerial vehicle (UAV) scanning module, a map module, a vehicle dispatching command platform and a data center module; the on-board control module is configured to control driving of the vehicle according to a control instruction sent by the vehicle dispatching command platform; the vehicle state module is configured to collect the state information of the vehicle and send the state information to the data center module; the environment sensing module is configured to collect the first road environment information of the vehicle and send the first road environment information to the data center module; the UAV scanning module is configured to collect the second road environment information of the vehicle and send the second road environment information to the data center module; the data center module is configured to generate fusion information according to the state information, the first road environment information and the second road environment information, and send the fusion information to the map module and the vehicle dispatching command platform; the map module is configured to generate the driving route map of the vehicle according to the fusion information; the vehicle dispatching command platform is configured to generate the control instruction according to the fusion information and the driving route map.

According to a second aspect of embodiments of the present disclosure, there is provided a vehicle control method applied to the vehicle control system described in the embodiment of the first aspect of the present disclosure, the vehicle control method includes: controlling the vehicle state module to collect the vehicle state information and send the state information to the data center module; controlling the environment sensing module to collect the first road environment information of the vehicle and send the first road environment information to the data center module; controlling the UAV scanning module to collect the second road environment information of the vehicle and send the second road environment information to the data center module; controlling the data center module to generate fusion information according to the state information, the first road environment information and the second road environment information, and send the fusion information to the map module and the vehicle dispatching command platform; controlling the map module to generate the driving route map of the vehicle according to the fusion information; controlling the vehicle dispatching command platform to generate a control instruction according to the fusion information and the driving route map, and send the control instruction to the on-board control module; controlling the on-board control module to control driving of the vehicle according to the control instruction.

The additional aspects and advantages of the present disclosure will be given in the following description, some of which will be apparent from the following description, or will be learned through the practice of the present disclosure.

BRIEF DESCRIPTION OF THE DRAWINGS

The above and/or additional aspects and advantages of the present disclosure will be apparent and easy to understand from the following description of the embodiments together with the drawings, wherein.

DETAILED DESCRIPTION

Figure 1:
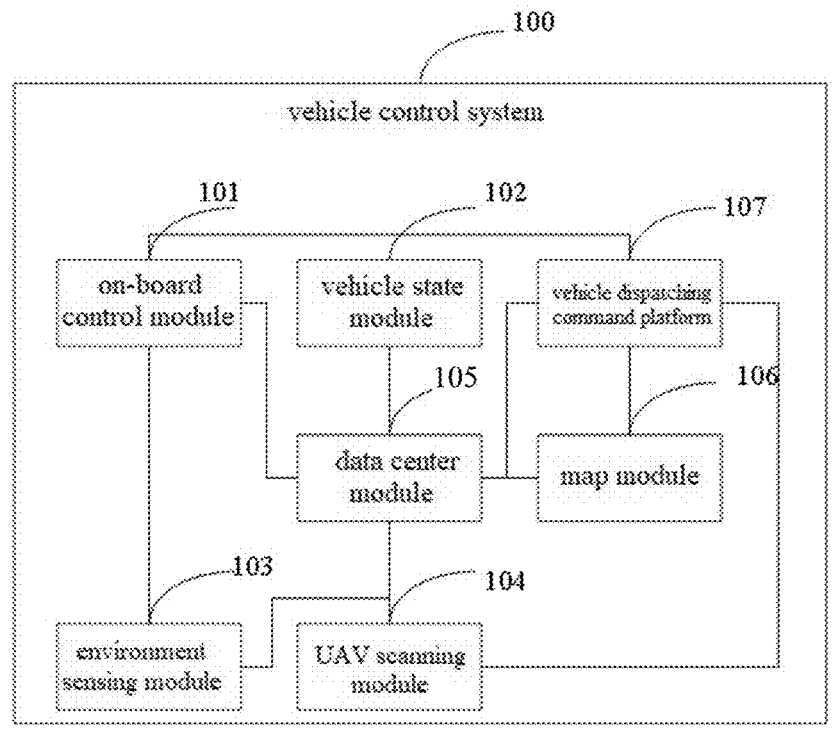
FIG. 1 is a block diagram of a vehicle control system according to an embodiment of the present disclosure.

The following describes in detail the embodiments of the present disclosure, examples of which are shown in the drawings, wherein the same or similar reference numerals represent the same or similar elements or elements having the same or similar functions. The embodiments described below with reference to the drawings are exemplary and are intended to explain the present disclosure, but are not to be understood as limiting the present disclosure.

The vehicle control system and method of the embodiments of the present disclosure are described below in combination with the drawings.

The execution subject of the vehicle control system of the embodiment of the present disclosure is the vehicle control device of the embodiment of the present disclosure. FIG. 1 is a block diagram of a vehicle control system according to an embodiment of the present disclosure. As shown in FIG. 1, the vehicle control system of the embodiment of the present disclosure may include: an on-board control module 101, a vehicle state module 102, an environment sensing module 103, a UAV scanning module 104, a data center module 105, a map module 106 and a vehicle dispatching command platform 107. The on-board control module 101 is connected with the vehicle dispatching command platform 107 and the data center module 105, the vehicle state module 102 is connected with the data center module 105, the environment sensing module 103 is connected with the data center module 105, the map module 106 is connected with the vehicle dispatching command platform 107 and the data center module 105, the vehicle dispatching command platform 107 is connected with the data center module 105, the UAV scanning module 104, the map module 106 and the on-board control module 101, the data center module 105 is connected with the UAV scanning module 104, the environment sensing module 103, the on-board control module 101, the vehicle state module 102, the vehicle dispatching command platform 107 and the map module 106.

The on-board control module 101 is configured to control the vehicle driving according to the control instruction sent by the vehicle dispatching command platform 107. The on-board control module 101 is mainly configured to control the behaviors of the vehicle, such as start, acceleration, deceleration, braking, parking, etc. This module needs to be installed on the vehicle.

Specifically, when the vehicle control system 100 controls the vehicle, the on-board control module 101 can control the vehicle driving according to the control instruction sent by the vehicle dispatching command platform 107, that is, receive the control instruction from the vehicle dispatching command platform 107 and adjust the driving state of the vehicle according to the control instruction, so as to make the vehicle drive along the predetermined driving route, avoiding vehicle deviation from the driving route and accidents of vehicles.

The vehicle state module 102 is configured to collect the state information of the vehicle and send the state information to the data center module 105. The state information may include but not limited to vehicle identification information, vehicle speed, vehicle position information, vehicle pose information, etc., wherein the vehicle pose information may include but not limited to acceleration, deceleration, rollover, etc. The vehicle state module 102 is mainly configured to collect the vehicle identification information, vehicle speed, vehicle position information and vehicle pose information. This module is also installed on the vehicle.

Specifically, the vehicle state module 102 collects the vehicle state information and sends the collected vehicle state information to the data center module 105.

It should be noted that each vehicle may be installed with one on-board control module 101 and one vehicle state module 102.

Alternatively, the on-board control module and the vehicle state module can be installed on the head of the vehicle.

In addition, the main function of the vehicle state module 102 is, on the one hand, to collect the vehicle state information and transmit the collected information to the data center module 105, the decision of adjusting the vehicle with control instruction can be obtained through the analysis of the information collected by the vehicle state module 102; on the other hand, to collect the vehicle state information after sending the control instruction to the on-board control module 101, so as to feed back whether the vehicle adjustment results meet the requirements.

The environment sensing module 103 is configured to collect the first road environment information of the vehicle, and send the first road environment information to the data center module 105. The first road environment information can include but not limited to road terrain information, vehicle identification information, vehicle position information, vehicle video information, etc. The environment sensing module 103 is mainly configured to collect road terrain information, vehicle identification information, vehicle position information, vehicle video information, etc. The environment sensing module 103 can be arranged at certain intervals on both sides of the transport road. It should be noted that the interval can be set according to the actual situation; there is no further restriction on this in the present disclosure.

Specifically, the environment sensing module 103 collects the first road environment information of the vehicle and sends it to the data center module 105.

Alternatively, the environment sensing module 103 can be arranged on both sides of the driving route, by determining the positions of the loading point and the unloading point in the mining area and determining the driving route of the vehicle according to the positions of these two points. The UAV scanning module 104 is configured to collect the second road environment information of the vehicle and send the second road environment information to the data center module 105. The second road environment information can include but not limited to road terrain information and vehicle video information, etc. The UAV scanning module 104 is mainly configured to collect the road terrain information and vehicle video information of the vehicle.

Specifically, the UAV scanning module 104 collects the second road environment information of the vehicle and sends it to the data center module 105. The data center module 105 is configured to generate fusion information according to the state information, the first road environment information and the second road environment information, and send the fusion information to the map module and the vehicle dispatching command platform. The data center module 105 is mainly configured to classify, store, fuse and analyze the road terrain information, vehicle state information and vehicle video information sensed by the on-board control module 101, vehicle state module 102, environment sensing module 103 and UAV scanning module 104, to generate a road map based on the analysis results of road terrain information, to display the road map and vehicle state information on the vehicle dispatching command platform 107, to form the vehicle control instruction according to the relationship between the vehicle state information and the road map, and send the control instruction to the on-board control module 101 via the vehicle dispatching command platform 107 so as to dispatch and control the transport vehicles.

Specifically, the data center module 105 generates fusion information according to the state information, the first road environment information and the second road environment information, and sends it to the map module 106 and the vehicle dispatching command platform 107.

The map module 106 is configured to generate a driving route map of the vehicle according to the fusion information. The map module 106 is mainly configured to fuse the road terrain information sensed by the environment sensing module 103 and the road terrain information sensed by the UAV scanning module 104 to generate the driving route map of the vehicle, so as to provide position calibration and control services for the vehicle.

Specifically, the map module 106 further generates a driving route map of the vehicle according to the fusion information generated by the state information, the first road environment information and the second road environment information.

The vehicle dispatching command platform 107 is configured to generate the control instruction according to the fusion information and the driving route map. The vehicle dispatching command platform 107 is mainly configured to display the road environment information and vehicle state information, and control the vehicle via the on-board control module 101 according to the information sensed by the vehicle state module 102, the environment sensing module 103, the UAV scanning module 104 and the map module 106.

Specifically, the vehicle dispatching command platform 107 generates corresponding control instruction according to the fusion information and the driving route map. In the embodiment of the present disclosure, the vehicle driving is controlled by the on-board control module 101 according to the control instruction sent by the vehicle dispatching command platform 107, the vehicle state information is collected by the vehicle state module 102, the state information is sent to the data center module 105, and the first road environment information of the vehicle is collected by the environment sensing module 103 and sent to the data center module 105, then the second road environment information of the vehicle is collected through the UAV scanning module 104 and sent to the data center module 105, and the fusion information is generated via the data center module 105 according to the state information, the first road environment information and the second road environment information, the fusion information is sent to the map module 106 and the vehicle dispatching command platform 107, and the vehicle driving route map is generated via the map module 106 according to the fusion information, finally, the control instruction is generated via the vehicle dispatching command platform 107 according to the fusion information and the driving route map. The on-board control system of the embodiment of the present disclosure collects vehicle state information and road environment information through various modules on the road, reduces the fault points of the vehicle, reduces the difficulty of vehicle maintenance and the complexity of technical implementation, and thus reduces the cost of technical implementation.

Figure 2:
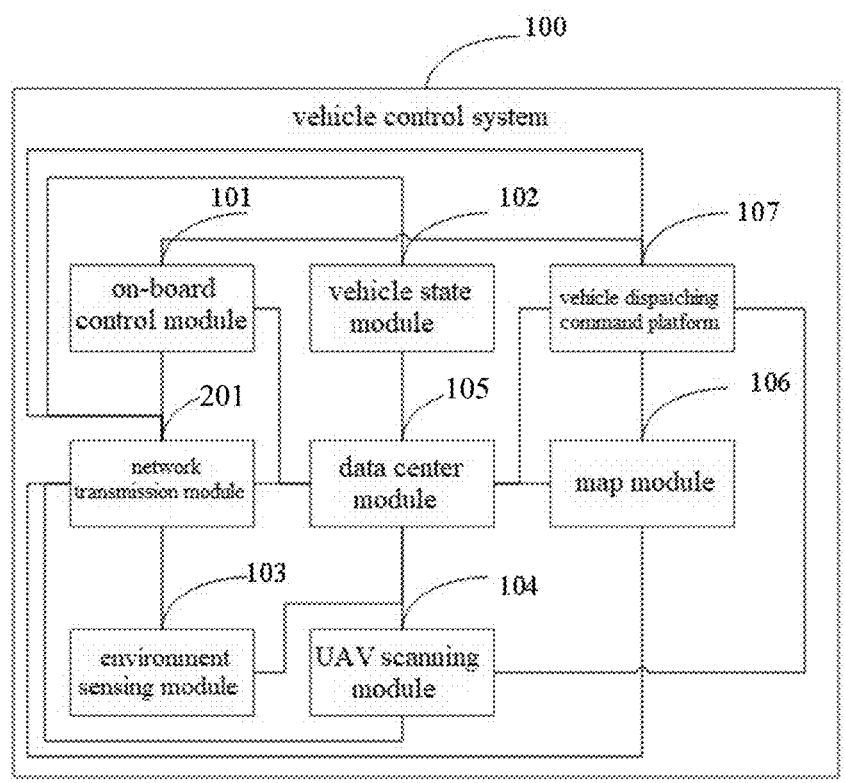
FIG. 2 is a block diagram of a vehicle control system according to another embodiment of the present disclosure.

In one embodiment of the present disclosure, as shown in FIG. 2, the vehicle control system 100 may also include a network transmission module 201. The network transmission module 201 is connected with the on-board control module 101, the vehicle state module 102, the environment sensing module 103, the UAV scanning module 104, the data center module 105, the map module 106 and the vehicle dispatching command platform 107. That is, the network transmission module 201 is connected with all other modules.

Specifically, the network transmission module 201 is configured to provide network interaction services for each module or platform in the vehicle control system 100. The network transmission module 201 is mainly configured to provide network interaction services between the on-board control module 101, the vehicle state module 102, the environment sensing module 103, the UAV scanning module 104, the data center module 105, the map module 106 and the vehicle dispatching command platform 107. The network interaction mode can adopt wired or wireless communication mode according to the actual situation of the project field, there is no further restriction on this in the present disclosure.

Figure 3:
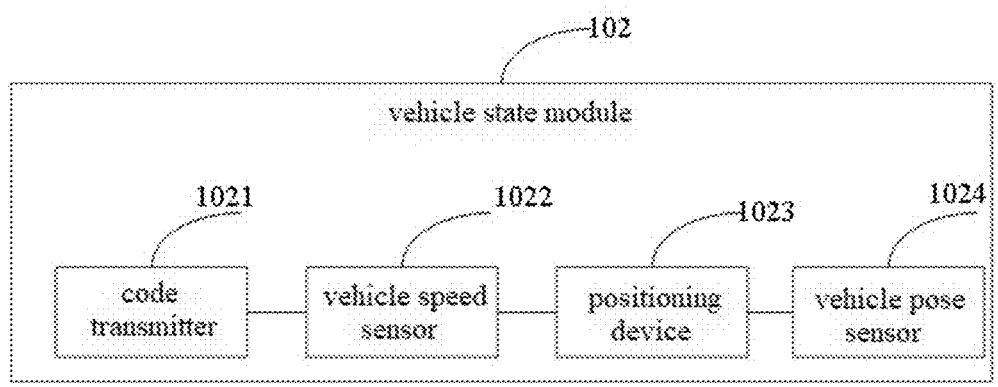
FIG. 3 is a block diagram of a vehicle state module according to an embodiment of the present disclosure.

Further, in an embodiment of the present disclosure, the state information includes vehicle identification information, vehicle speed, vehicle position information and vehicle pose information. As shown in FIG. 3, the vehicle state module 102 includes: code transmitter 1021, vehicle speed sensor 1022, positioning device 1023 and vehicle pose sensor 1024.

The code transmitter 1021 is configured to collect the vehicle identification information, that is, to effectively command and dispatch the vehicle, the code transmitter 1021 is installed on each vehicle to code the vehicle and collect the vehicle identification information. The vehicle speed sensor 1022 is configured to collect the vehicle speed, that is, the running speed of the vehicle. The positioning device 1023 is configured to collect the vehicle position information, that is, the driving position of the vehicle. The vehicle pose sensor 1024 is configured to collect vehicle pose information.

It should be noted that the code transmitter 1021 can calibrate the number of the vehicle by transmitting information to the code collector 1033 of the environment sensing module 103.

Figure 4:
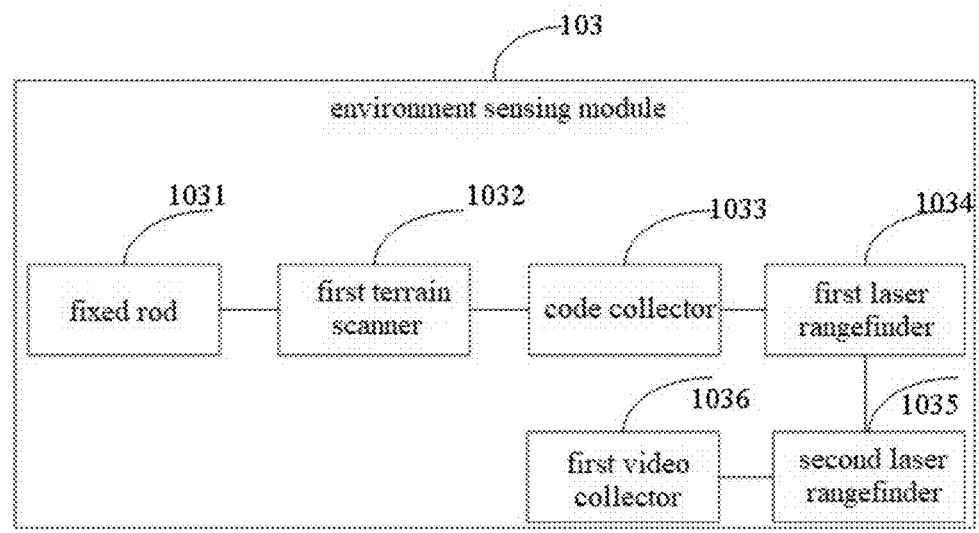
FIG. 4 is a block diagram of an environment sensing module according to an embodiment of the present disclosure.

In one embodiment of the present disclosure, as shown in FIG. 4, the environment sensing module 103 includes: a fixed rod 1031 arranged on the road; a first terrain scanner 1032 arranged on the fixed rod 1031 and configured to collect road terrain information; a code collector 1033 arranged on the fixed rod 1031 and configured to collect the vehicle identification information; a first laser rangefinder 1034 arranged on the fixed rod 1031 and configured to collect the distance information between the vehicle and the first laser rangefinder, the laser emission direction of the first laser rangefinder is perpendicular to the long axis direction of the road; a second laser rangefinder 1035 arranged on the fixed rod 1031 and configured to collect the distance information between the vehicle and the second laser rangefinder, the laser emission direction of the second laser rangefinder is biased towards the opposite direction of the driving direction of the vehicle and forms an acute angle with the laser emission direction of the first laser rangefinder; a first video collector 1036 arranged on the fixed rod 1031 and configured to collect vehicle video information.

Figure 5:
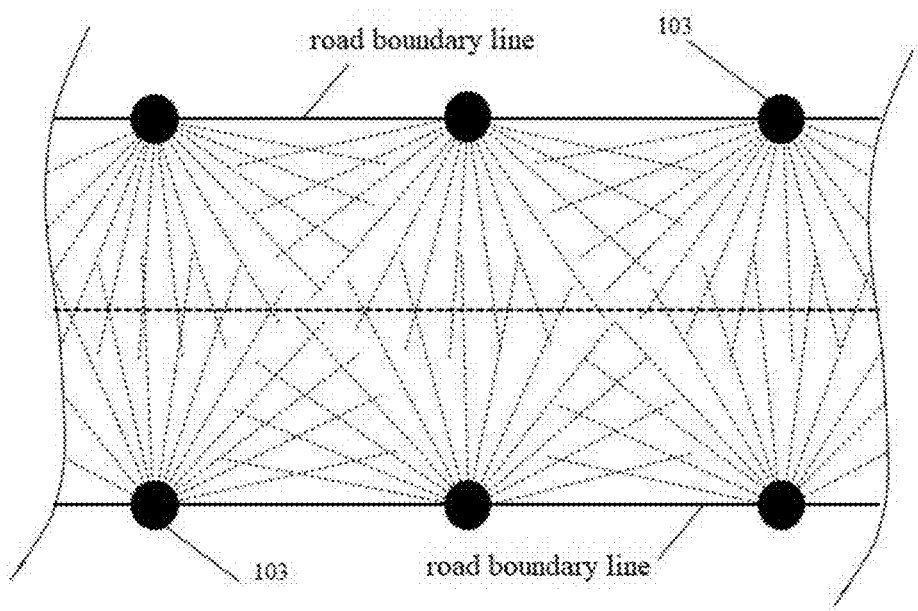
FIG. 5 is a schematic diagram of a fixed rod according to an embodiment of the present disclosure.

As shown in FIG. 5, the fixed rods 1031 are fixed on both sides of the vehicle travel route, generally in an symmetrical arrangement, that is, a row of fixed rods 1031 are arranged on each side of the vehicle travel route. The number of fixed rods can be set according to the actual situation, for example in FIG. 5, three fixed rods are arranged on both sides of the vehicle travel route, there is no further limitation on this in the present disclosure.

The first terrain scanner 1032 is installed on the top of the fixed rod 1031, and the first terrain scanner 1032 can rotate at a certain angle to scan the terrain and road condition information of the vehicle driving road. The scanning range of the first terrain scanner 1032 on the adjacent two environment sensing modules 103 should overlap to a certain extent, in order to realize full coverage of the road terrain and road condition information between the two adjacent environment sensing modules 103, as shown in FIG. 5. By splicing the terrain information scanned by the adjacent first terrain scanner 1032, the complete road terrain and road condition information of the vehicle transportation route can be obtained.

Figure 6:
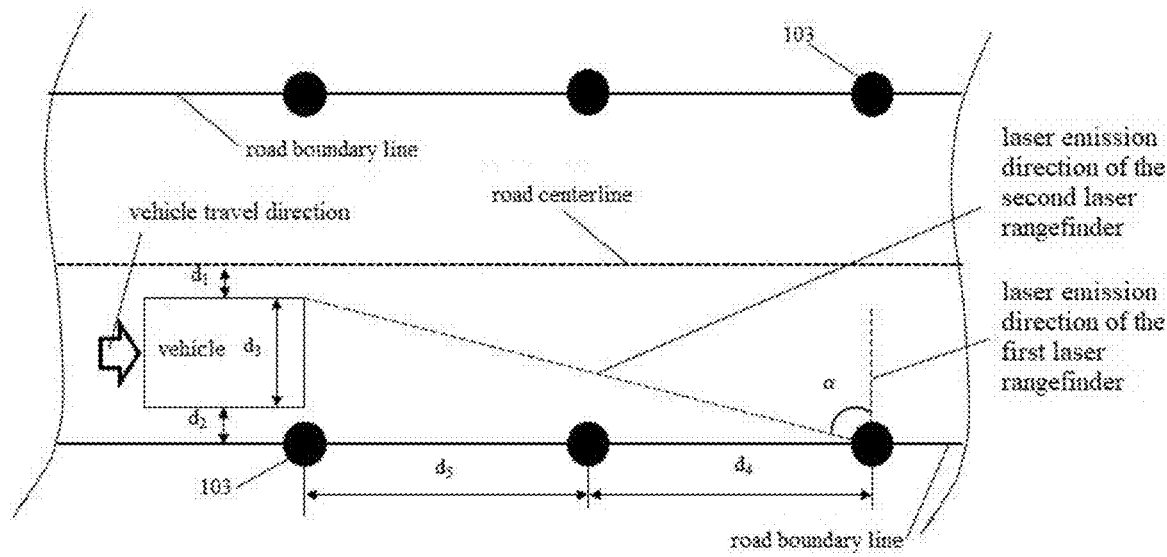
FIG. 6 is the first schematic diagram of sensing the road deviation of a vehicle according to an embodiment of the present disclosure.

The first laser rangefinder 1034 is fixed on the fixed rod 1031, and the laser emission direction of the first laser rangefinder 1034 is perpendicular to the long axis direction of the vehicle driving road, as shown in FIG. 6.

The second laser rangefinder 1035 is fixed on the fixed rod 1031, and the laser emission direction of the second laser rangefinder 1035 is at an included angle with the laser emission direction of the first laser rangefinder 1034, as shown in FIG. 6. The included angle between the two is determined as follows:

The laser emission direction of the second laser rangefinder 1035 should be biased towards the opposite direction of the vehicle travel direction, as shown in FIG. 6. Set the safe separation distance between the vehicle and the road centerline as $d_1$, the safe separation distance between the vehicle and the road boundary line as $d_2$, the vehicle width as $d_3$, and the separation distances between the environment sensing module 103 and the two adjacent environment sensing modules 103 in the opposite direction of the vehicle travel direction as $d_4$, $d_5$, respectively, the included angle between the laser emission direction of the second laser rangefinder 1035 and the laser emission direction of the first laser rangefinder 1034 as α, then:

$$\alpha = \arctan\frac{d_4 + d_5}{d_2 + d_3}$$

At this time, the distance $d_6$ measured by the second laser rangefinder 1035 is:

$$d_6=\sqrt{(d_4+d_5)^2+(d_2+d_3)^2}$$

In the above formula, $d_1$, $d_2$, $d_3$, $d_4$ and $d_5$ are all known quantities, which can be determined according to the actual situation of the project field, there is no further limitation on this in the present disclosure.

Figure 7:
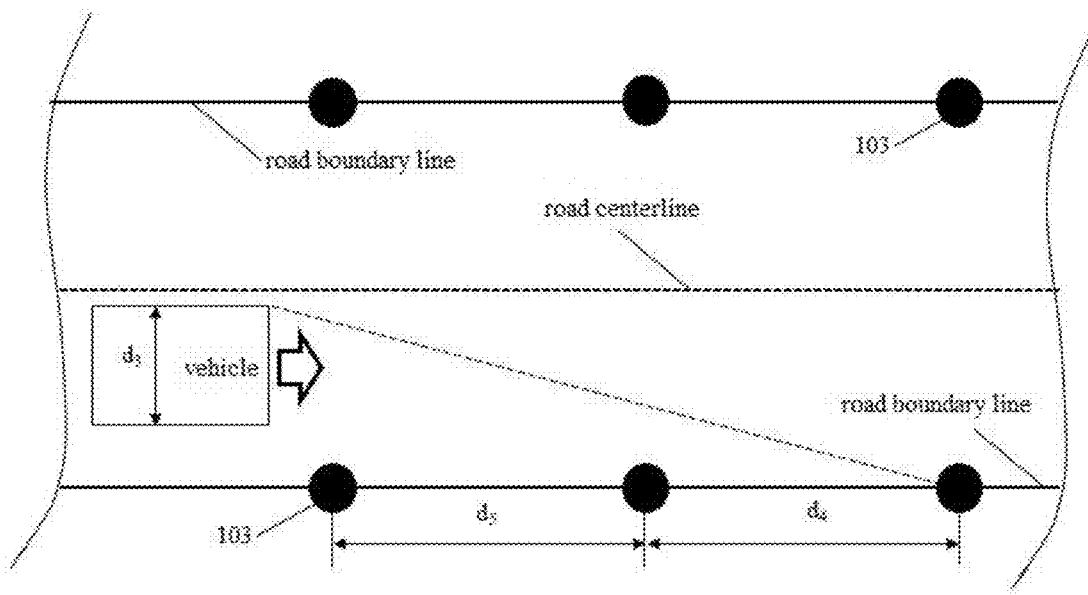
FIG. 7 is the second schematic diagram of sensing the road deviation of a vehicle according to an embodiment of the present disclosure.

Although the positioning device 1023 in the vehicle state module 102 can position the location of the vehicle, the positioning accuracy of the existing accurate positioning system for moving objects is difficult to meet the requirements, frequently resulting in errors and causing accidents. The second laser rangefinder 1035 can sense the road deviation of the driving vehicle. Specifically, when the vehicle is running, set the distance to the vehicle which is measured by the second laser rangefinder 1035 for the first time as $d'_6$ If $d'_6>d_6$, it means that the vehicle is biased to the side of the road centerline, as shown in FIG. 7, at this moment, the vehicle should be adjusted to the side of the road boundary line, and the adjustment distance is $d_7$:

$$d_7=d'_6\times\cos\alpha-d_3-d_2$$

Figure 8:
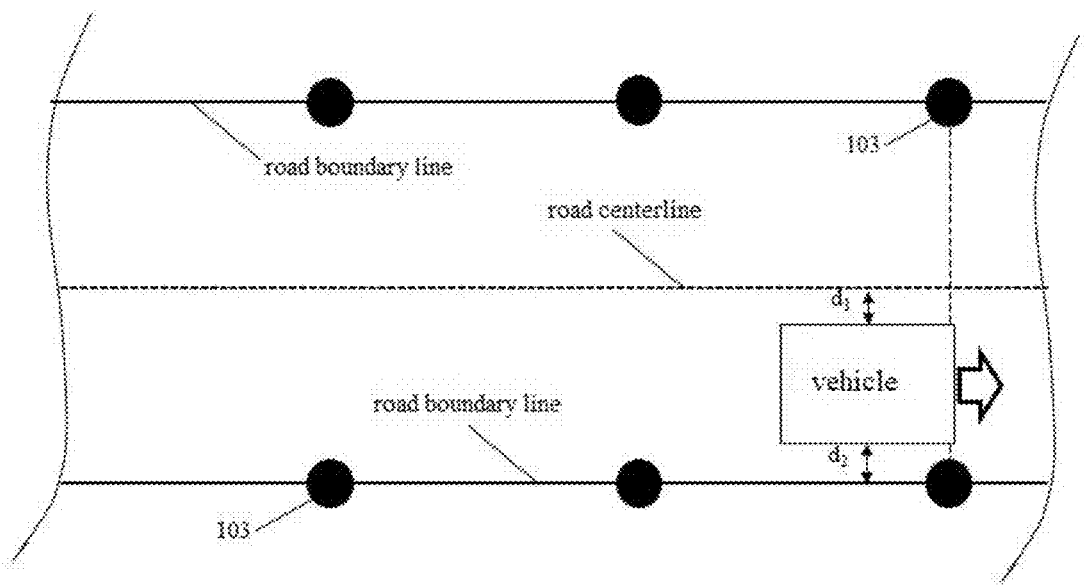
FIG. 8 is the third schematic diagram of sensing the road deviation of a vehicle according to an embodiment of the present disclosure.
Figure 9:
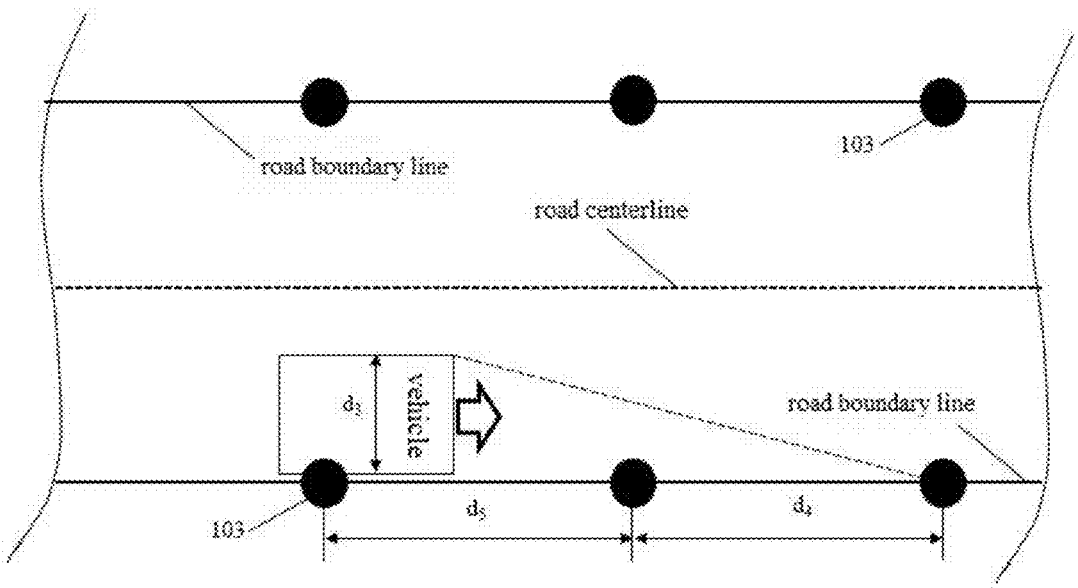
FIG. 9 is the fourth schematic diagram of sensing the road deviation of a vehicle according to an embodiment of the present disclosure.

When the vehicle travels to the position of the environment sensing module 103 at which the second laser rangefinder 1035 is located, as shown in FIG. 8, the first laser rangefinder 1034 is used to measure the distance between the vehicle and the road boundary line $d_2$;

If $d'_2=d_2$, it indicates that the vehicle deviation has been adjusted in place;

If $d'_2>d_2$, it indicates that the adjustment of the vehicle deviation is insufficient, and the adjustment is still needed later;

If $d'_2<d_2$, it means that the adjustment of the vehicle deviation is too much, and the adjustment in the opposite direction is needed later;

Specifically, if, during the driving of the vehicle, $d'_6<d_6$ is detected, it indicates that the vehicle is biased to the side of the road boundary line, as shown in FIG. 9. At this moment, the vehicle should be adjusted to the side of the road centerline, and the adjusted distance is $d_8$:

$$d_8=d_2-(d'_6\times\cos\alpha-d_3)$$

When the vehicle travels to the position of the environment sensing module 103 at which the second laser rangefinder 1035 is located, the first laser rangefinder 1034 is used to measure the distance between the vehicle and the road boundary line $d'_2$;

If $d'_2=d_2$, it indicates that the vehicle deviation has been adjusted in place;

If $d'_2>d_2$, it means that the adjustment of the vehicle deviation is too much, and the adjustment in the opposite direction is needed later;

If $d'_2<d_2$, it indicates that the adjustment of the vehicle deviation is insufficient, and the adjustment is still needed later.

When the vehicle runs to a corner of the road, at first, determine the approximate position of the vehicle on the road via the positioning device 1023 in the vehicle state module 102, and send a deceleration instruction to the on-board control module 101 via the vehicle dispatching command platform 107, at the same time, measure the distance to the vehicle measured for the first time with the second laser rangefinder 1035, and use the above method to adjust the position of the vehicle.

In addition, if the distance to the vehicle measured by the second laser rangefinder 1035 for the first time is $d'_6$ and $d'_6$ decreases rapidly with time, it indicates that the second laser rangefinder 1035 monitors the vehicle running in the lane in this direction; If the initial value of $d'_6$ changes little with time and then increases rapidly, it indicates that the second laser rangefinder 1035 monitors the vehicle running in the lane in the opposite direction; the specific vehicle monitored by the second laser rangefinder 1035 can be determined by the positioning device 1023 and the above method.

In addition, through the time difference of the same vehicle monitored by two adjacent first laser rangefinders 1034 and the interval distance between two adjacent first laser rangefinders 1034, the interval distance may be divided by the time difference, and the calculated quotient is the vehicle speed. This calculation result can be mutually verified with the monitoring value of the vehicle speed sensor 1022.

The first video collector 1036 is installed on the fixed rod 1031, and the first video collector 1036 can rotate at a certain angle to collect the information of vehicle driving conditions. By splicing the video information collected by the adjacent video collectors 1036, the real-time video information of the whole transportation route can be obtained.

The code collector 1033 is installed on the fixed rod 1031, and is configured to receive the information transmitted by the code transmitter 1021 in the vehicle state module 102 installed on the vehicle, so as to realize the identification and calibration of the vehicle.

Figure 10:
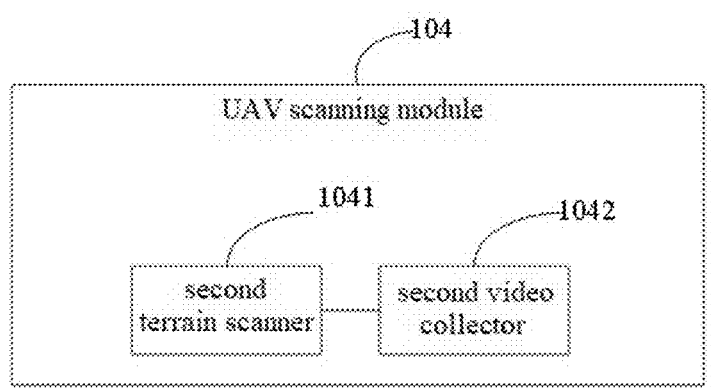
FIG. 10 is a composition block diagram of a UAV scanning module according to an embodiment of the present disclosure.

Further, in an embodiment of the present application, as shown in FIG. 10, the UAV scanning module 104 includes a second terrain scanner 1041 and a second video collector 1042. The second terrain scanner 1041 is configured to collect road terrain information. The second video collector 1042 is configured to collect vehicle video information.

It should be noted that, the UAV, due to its flexibility, may collect the vehicle transportation road information and the surrounding terrain information with the second terrain scanner 1041, and collect the vehicle operation information with the second video collector 1042. Although the terrain information can be scanned by the first terrain scanner 1032 in the environment sensing module 103 and the complete terrain information of the entire transportation road can be obtained by using the information splicing technology, there may be errors in the information splicing results, this terrain information can be used for mutual verification with the information collected by the second terrain scanner 1041 in the UAV scanning module 104, so as to improve the accuracy of the transportation road terrain information. Similarly, the information collected by the second video collector 1042 in the UAV scanning module 104 is used for mutual verification with the information collected by the first video collector 1036 in the environment sensing module 103, and the complete video information formed by the video splicing technology, in order to improve the accuracy of the vehicle operation information. In addition, when an emergency occurs in some areas or an environment sensing module 103 fails, the UAV scanning module 104 can be used to collect information in relevant areas, so as to improve the flexibility of the system.

In addition, the map module 106 mainly uses the road terrain information obtained by the first terrain scanner 1032 in the environment sensing module 103 and the information collected by the second terrain scanner 1041 in the UAV scanning module 104 to generate the corresponding road terrain map for vehicle operation, and marks and displays the vehicle operation, the position of the UAV scanning module 104 and the position of the environment sensing module 103 in the map, so as to provide map service for vehicle control.

Thus, the control efficiency and accuracy of the vehicle control system are improved through network transmission and vehicle coding, thus improving the working efficiency of the vehicle.

A vehicle control method according to an embodiment of the present disclosure is described below with reference to the drawings.

Figure 11:
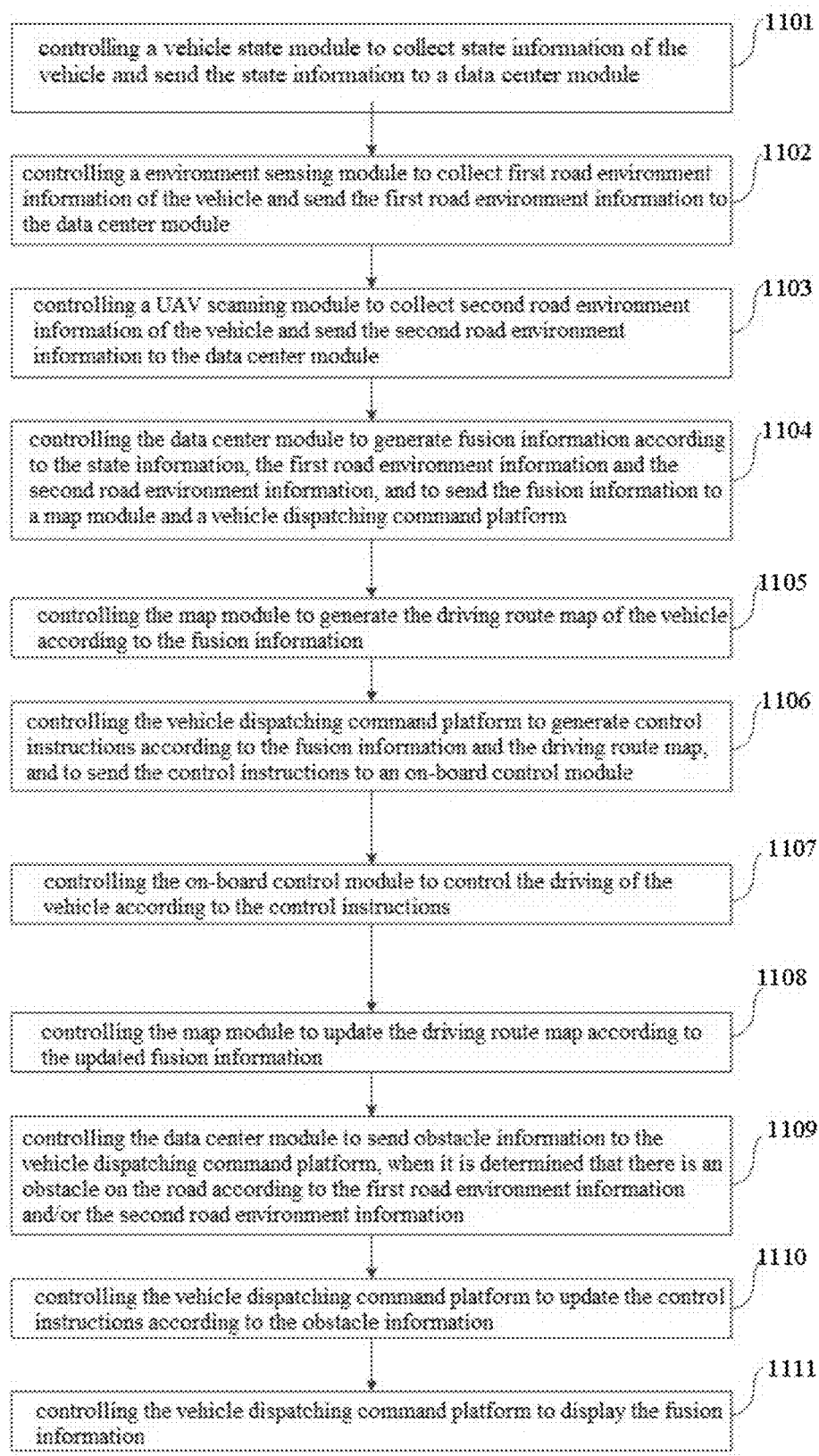
FIG. 11 is a flowchart of a vehicle control method according to an embodiment of the present disclosure.

FIG. 11 is a flowchart of a vehicle control method according to an embodiment of the present disclosure.

The vehicle control method of the embodiment of the present disclosure can be executed by the vehicle control system, in order to control the vehicle state module to collect the vehicle state information and send the state information to the data center module; control the environment sensing module to collect the first road environment information of the vehicle and send the first road environment information to the data center module; control the UAV scanning module to collect the second road environment information of the vehicle and send the second road environment information to the data center module; control the data center module to generate fusion information according to the state information, the first road environment information and the second road environment information, and send the fusion information to the map module and the vehicle dispatching command platform; control the map module to generate the vehicle driving route map according to the fusion information; control the vehicle dispatching command platform to generate the control instruction according to the fusion information and the driving route map, and send the control instruction to the on-board control module; and control the on-board control module to control driving of the vehicle according to the control instruction. Accordingly, reduce the fault points of the vehicle, reduce the difficulty of vehicle maintenance and the complexity of technical implementation, and thus reduce the cost of technical implementation.

It should be noted that the structure and function of the vehicle control method described in this embodiment can be seen in the foregoing description of the vehicle control system, which will not be repeated here.

As shown in FIG. 11, the vehicle control method may include:

Step 1101 of controlling the vehicle state module to collect the vehicle state information and sending the state information to the data center module. The state information may include but not limited to vehicle identification information, vehicle speed, vehicle position information, vehicle pose information, etc., wherein the vehicle pose information may include but not limited to acceleration, deceleration, rollover, etc. The vehicle state module is mainly configured to collect the vehicle identification information, vehicle speed, vehicle position information and vehicle pose information. The vehicle state module is installed on the vehicle.

Specifically, when the vehicle control system controls the vehicle, the vehicle state module collects the vehicle state information and sends the collected vehicle state information to the data center module.

It should be noted that each vehicle may be installed with one on-board control module and one vehicle state module.

Alternatively, the on-board control module and the vehicle state module can be installed on the head of the vehicle.

In addition, the main function of the vehicle state module is, on the one hand, to collect the vehicle state information and transmit the collected information to the data center module, the decision of adjusting the vehicle with the control instruction is obtained through the analysis of the information collected by the vehicle state module; on the other hand, to collect the vehicle state information after sending the control instruction to the on-board control module, so as to feed back whether the vehicle adjustment results meet the requirements.

Step 1102 of controlling the environment sensing module to collect the first road environment information of the vehicle and send the first road environment information to the data center module. The first road environment information can include but not limited to road terrain information, vehicle identification information, vehicle position information, vehicle video information, etc. The environment sensing module is mainly configured to collect road terrain information, vehicle identification information, vehicle position information, vehicle video information, etc. The environment sensing module can be arranged at certain intervals on both sides of the transport road. It should be noted that the interval can be set according to the actual situation, there is no further restriction on this in the present disclosure.

Specifically, the environment sensing module collects the first road environment information of the vehicle and sends it to the data center module.

Alternatively, the environment sensing module can be arranged on both sides of the driving route, by determining the positions of the loading point and the unloading point in the mining area and determining the driving route of the vehicle according to the positions of these two points.

Step 1103 of controlling the UAV scanning module to collect the second road environment information of the vehicle and send the second road environment information to the data center module. The second road environment information can include but not limited to road terrain information and vehicle video information, etc. The UAV scanning module is mainly controlled to collect the road terrain information and vehicle video information of the vehicle.

Specifically, the UAV scanning module collects the second road environment information of the vehicle and sends it to the data center module.

In order to clearly explain the previous embodiment, in an embodiment of the present disclosure, controlling the UAV scanning module to collect the second road environment information of the vehicle includes: controlling the UAV scanning module to periodically collect the second road environment information of the vehicle.

Specifically, the UAV scanning module is controlled to periodically collect the second road environment information of the vehicle.

It should be noted that the period for the periodic collection can be set according to the actual situation, for example, it can be two hours, there is no further limitation on this in the present disclosure.

Step 1104 of controlling the data center module to generate fusion information according to the state information, the first road environment information and the second road environment information, and send the fusion information to the map module and the vehicle dispatching command platform. The data center module is mainly configured to classify, store, fuse and analyze the sensed road terrain information, vehicle state information and vehicle video information, to generate a road map based on the analysis results of road terrain information, to display the road map and vehicle state information on the vehicle dispatching command platform, to form the vehicle control instruction according to the relationship between the vehicle state information and the road map, and send the control instruction to the on-board control module via the vehicle dispatching command platform, so as to dispatch and control the vehicles.

Specifically, the data center module generates fusion information according to the state information, the first road environment information and the second road environment information, and sends it to the map module and the vehicle dispatching command platform.

Step 1105 of controlling the map module to generate the driving route map of the vehicle according to the fusion information. The map module is mainly controlled to fuse the road terrain information sensed by the environment sensing module and the road terrain information sensed by the UAV scanning module to generate the driving route map of the vehicle, so as to provide position calibration and control services for the vehicle.

Specifically, the map module is controlled to generate the driving route map of the vehicle according to the fusion information generated by the state information, the first road environment information and the second road environment information.

Step 1106 of controlling the vehicle dispatching command platform to generate the control instruction according to the fusion information and the driving route map, and send the control instruction to the on-board control module. The vehicle dispatching command platform is mainly controlled to display the road environment information of the vehicle and the state information of the vehicle, and control the vehicle via the on-board control module according to the information sensed by the vehicle state module, the environment sensing module, the UAV scanning module and the map module.

Specifically, the vehicle dispatching command platform generates the control instruction according to the fusion information and the driving route map.

Step 1107 of controlling the on-board control module to control driving of the vehicle according to the control instruction. The control is mainly for the behaviors of the vehicle, such as start, acceleration, deceleration, braking, parking, etc. This module needs to be installed on the vehicle.

Specifically, when the vehicle control system controls the vehicle, the on-board control module is controlled to control the vehicle driving according to the control instruction sent by the vehicle dispatching command platform, that is, to receive the control instruction from the vehicle dispatching command platform and adjust the driving state of the vehicle according to the control instruction, so as to make the vehicle drive along the predetermined driving route, avoiding vehicle deviation from the driving route and accidents of vehicles.

Step 1108 of controlling the map module to update the driving route map according to the updated fusion information.

Specifically, the map module is controlled to update the driving route map according to the updated fusion information.

Step 1109 of controlling the data center module to send obstacle information to the vehicle dispatching command platform, when it is determined that there is an obstacle on the road according to the first road environment information and/or the second road environment information.

Specifically, when it is determined that there is an obstacle on the road according to the first road environment information and/or the second road environment information, the control data center module is controlled to send the obstacle information to the vehicle dispatching command platform.

Step 1110 of controlling the vehicle dispatching command platform to update the control instruction according to the obstacle information.

Specifically, the vehicle dispatching command platform is controlled to update the control instruction according to the obstacle information.

Step 1111 of controlling the vehicle dispatching command platform to display the fusion information.

Specifically, the vehicle dispatching command platform is controlled to display the fusion information.

In the embodiment of the present disclosure, the vehicle state module is controlled to collect the vehicle state information and send the state information to the data center module, the environment sensing module is controlled to collect the first road environment information of the vehicle and send the first road environment information to the data center module, the UAV scanning module is controlled to collect the second road environment information of the vehicle and send the second road environment information to the data center module, the data center module is controlled to generate fusion information according to the state information, the first road environment information and the second road environment information, and send the fusion information to the map module and the vehicle dispatching command platform, the map module is controlled to generate the vehicle driving route map according to the fusion information, the vehicle dispatching command platform is controlled to generate the control instruction according to the fusion information and the driving route map, and send the control instruction to the on-board control module. Accordingly, reduce the difficulty of vehicle maintenance and the complexity of technical implementation, and thus reduce the cost of technical implementation.

In the description of the present disclosure, it should be understood that the azimuth or positional relationship indicated by the terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential" and the like is based on the azimuth or positional relationship shown in the drawings, it is only for the convenience of describing the disclosure and simplifying the description, rather than indicating or implying that the device or element referred to must have a specific azimuth, be constructed and operated in a specific azimuth, and thus, it cannot be understood as a limitation of the present disclosure.

In addition, the terms "first" and "second" are only used for description, and cannot be understood as indicating or implying relative importance or implicitly indicating the number of indicated technical features. Thus, the features defined as "first" and "second" may explicitly or implicitly include one or more of this feature. In the description of the present disclosure, "multiple" means two or more, unless otherwise specifically defined.

In this application, unless otherwise specified and limited, the terms "installation", "interconnection", "connection", "fixation" and other terms shall be understood in a broad sense, for example, they can be fixed connection, removable connection, or integrated; it can be mechanical connection or electrical connection; it can be directly connected or indirectly connected through an intermediate medium, it can be the connection within two elements or the interaction relationship between two elements. For those skilled in the art, the specific meaning of the above terms in the application can be understood according to the specific circumstances.

In this application, unless otherwise specified and limited, the first feature being "above" or "below" the second feature may be a direct contact of the first and second features, or an indirect contact through an intermediate medium of the first and second features. Moreover, the first feature being "above" and "on" the second feature may be that the first feature is directly above or obliquely above the second feature, or simply indicates that the horizontal height of the first feature is higher than the second feature. The first feature being "below" and "under" the second feature may be that the first feature is directly or obliquely below the second feature, or simply indicates that the horizontal height of the first feature is less than that of the second feature.

In the description of the specification, the description of the reference terms "one embodiment", "some embodiments", "example", "specific example", or "some examples" and the like means that the specific features, structures, materials, or attributes described in combination with the this embodiment or example are included in at least one embodiment or example of present disclosure. In this specification, the schematic expression of the above terms need not refer to the same embodiment or example. Further, the specific features, structures, materials, or attributes described may be combined suitably in any one or more embodiments or examples. In addition, those skilled in the art may combine the different embodiments or examples described in this specification with the features of different embodiments or examples without contradiction.

Although the embodiments of the present disclosure have been shown and described above, it can be understood that the above embodiments are exemplary and cannot be understood as limitations of the present application. Those skilled in the art may change, modify, substitute and replace the above embodiments within the scope of the present application.

The present disclosure aims to solve at least one of the technical problems in the related technology to a certain extent.

Therefore, the first object of the present disclosure is to provide a vehicle control system.

The second object of the present disclosure is to provide a vehicle control method.

According to a first aspect of embodiments of the present disclosure, there is provides a vehicle control system, including: an on-board control module and a vehicle state module arranged on the vehicle, an environment sensing module arranged on both sides of the road, a UAV scanning module, a map module, a vehicle dispatching command platform and a data center module; the on-board control module is configured to control driving of the vehicle according to a control instruction sent by the vehicle dispatching command platform; the vehicle state module is configured to collect the state information of the vehicle and send the state information to the data center module; the environment sensing module is configured to collect the first road environment information of the vehicle and send the first road environment information to the data center module; an unmanned aerial vehicle (UAV) scanning module is configured to collect the second road environment information of the vehicle and send the second road environment information to the data center module; the data center module is configured to generate fusion information according to the state information, the first road environment information and the second road environment information, and send the fusion information to the map module and the vehicle dispatching command platform; the map module is configured to generate the driving route map of the vehicle according to the fusion information; the vehicle dispatching command platform is configured to generate the control instruction according to the fusion information and the driving route map.

The vehicle control system of the embodiment of the present disclosure controls driving of the vehicle via the on-board control module according to the control instruction sent by the vehicle dispatching command platform, collects the state information of the vehicle via the vehicle state module, sends the state information to the data center module, collects the first road environment information of the vehicle via the environment sensing module and sends the first road environment information to the data center module, then collects the second road environment information of the vehicle via the UAV scanning module and sends the second road environment information to the data center module, and generates the fusion information according to the state information, the first road environment information and the second road environment information via the data center module, and sends the fusion information to the map module and the vehicle dispatching command platform, and generates the vehicle driving route map via the map module according to the fusion information, finally, generates the control instruction via the vehicle dispatching command platform according to the fusion information and the driving route map. The vehicle control system of the embodiment of the present disclosure collects vehicle state information and road environment information through various modules on the road, reduces the fault points of the vehicle, reduces the difficulty of vehicle maintenance and the complexity of technical implementation, and thus reduces the cost of technical implementation.

In addition, a vehicle control system according to the above embodiment of the present disclosure may also have the following additional features:

According to an embodiment of the present disclosure, the vehicle control system further includes a network transmission module configured to provide network interaction services for each module or platform in the vehicle control system.

According to an embodiment of the present disclosure, the state information includes vehicle identification information, vehicle speed, vehicle position information and vehicle pose information, and the vehicle state module includes: a code transmitter, configured to collect the vehicle identification information; a vehicle speed sensor, configured to collect the vehicle speed; a positioning device, configured to collect the vehicle position information; a vehicle pose sensor, configured to collect the vehicle pose information.

According to an embodiment of the present disclosure, the first road environment information includes road terrain information, vehicle identification information, vehicle position information and vehicle video information, and the environment sensing module includes: a fixed rod arranged on the road; a first terrain scanner, arranged on the fixed rod and configured to collect the road terrain information; a code collector, arranged on the fixed rod and configured to collect the vehicle identification information; a first laser rangefinder arranged on the fixed rod and configured to collect the distance information between the vehicle and the first laser rangefinder, the laser emission direction of the first laser rangefinder is perpendicular to the long axis direction of the road; a second laser rangefinder arranged on the fixed rod and configured to collect the distance information between the vehicle and the second laser rangefinder, the laser emission direction of the second laser rangefinder is biased towards the opposite direction of the driving direction of the vehicle and forms an acute angle with the laser emission direction of the first laser rangefinder; a first video collector, arranged on the fixed rod and configured to collect the vehicle video information.

According to an embodiment of the present disclosure, the second road environment information includes road terrain information and vehicle video information, and the UAV scanning module includes: a second terrain scanner, configured to collect the road terrain information; a second video collector, configured to collect the vehicle video information.

According to a second aspect of embodiments of the present disclosure, there is provided a vehicle control method applied to the vehicle control system described in the embodiment of the first aspect of the present disclosure, the vehicle control method includes: controlling the vehicle state module to collect the vehicle state information and send the state information to the data center module; controlling the environment sensing module to collect the first road environment information of the vehicle and send the first road environment information to the data center module; controlling the UAV scanning module to collect the second road environment information of the vehicle and send the second road environment information to the data center module; controlling the data center module to generate fusion information according to the state information, the first road environment information and the second road environment information, and send the fusion information to the map module and the vehicle dispatching command platform; controlling the map module to generate the driving route map of the vehicle according to the fusion information; controlling the vehicle dispatching command platform to generate a control instruction according to the fusion information and the driving route map, and send the control instruction to the on-board control module; controlling the on-board control module to control driving of the vehicle according to the control instruction.

The vehicle control method of the embodiment of the present disclosure controls the vehicle state module to collect the vehicle state information and send the state information to the data center module, controls the environment sensing module to collect the first road environment information of the vehicle and send the first road environment information to the data center module, controls the UAV scanning module to collect the second road environment information of the vehicle and send the second road environment information to the data center module, controls the data center module to generate fusion information according to the state information, the first road environment information and the second road environment information, and send the fusion information to the map module and the vehicle dispatching command platform, controls the map module to generate the vehicle driving route map according to the fusion information, controls the vehicle dispatching command platform to generate control instruction according to the fusion information and the driving route map, and send the control instruction to the on-board control module, controls the on-board control module to control driving of the vehicle according to the control instruction. The vehicle control method of the embodiment of the present disclosure collects vehicle state information and road environment information through various modules on the road, reduces the fault points of the vehicle, reduces the difficulty of vehicle maintenance and the complexity of technical implementation, and thus reduces the cost of technical implementation.

In addition, a vehicle control method according to the above embodiment of the present disclosure may also have the following additional features:

According to an embodiment of the present disclosure, the vehicle control method further includes: controlling the map module to update the driving route map according to the updated fusion information.

According to an embodiment of the present disclosure, the vehicle control method further includes: controlling the data center module to send obstacle information to the vehicle dispatching command platform, when it is determined that there is an obstacle on the road according to the first road environment information and/or the second road environment information; controlling the vehicle dispatching command platform to update the control instruction according to the obstacle information.

According to an embodiment of the present disclosure, the vehicle control method further includes: controlling the vehicle dispatching command platform to display the fusion information.

According to an embodiment of the present disclosure, controlling the UAV scanning module to collect the second road environment information of the vehicle includes: controlling the UAV scanning module to periodically collect the second road environment information of the vehicle.

What is claimed is:

1. A vehicle control system, comprising an on-board controller and a vehicle state sensor arranged on a vehicle, an environment sensor arranged on both sides of a road, a UAV scanner, a map processor, a vehicle dispatch controller, and a central data processor;
   the on-board controller is configured to control driving of the vehicle according to a control instruction sent by the vehicle dispatching controller;
   the vehicle state sensor is configured to collect state information of the vehicle and send the state information to the central data processor;
   the environment sensor is configured to collect first road environment information of the vehicle and send the first road environment information to the central data processor;
   the UAV scanner is configured to collect second road environment information of the vehicle and send the second road environment information to the central data processor;
   the central data processor is configured to generate fusion information according to the state information, the first road environment information and the second road environment information, and send the fusion information to the map processor and the vehicle dispatch controller;
   the map processor is configured to generate a driving route map of the vehicle according to the fusion information; and
   the vehicle dispatch controller is configured to generate the control instruction according to the fusion information and the driving route map,
   wherein the environment sensor comprises:
      a fixed rod arranged on the road;
      a first laser rangefinder, arranged on the fixed rod and configured to collect distance information between the vehicle and the first laser rangefinder, wherein a laser emission direction of the first laser rangefinder is perpendicular to a long axis direction of the road; and
      a second laser rangefinder, arranged on the fixed rod and configured to collect distance information between the vehicle and the second laser rangefinder, wherein a laser emission direction of the second laser rangefinder is biased towards an opposite direction of a driving direction of the vehicle and forms an acute angle with the laser emission direction of the first laser rangefinder.

2. The vehicle control system according to claim 1, further comprising:
   a network transceiver, configured to provide network interaction services for each device in the vehicle control system.

3. The vehicle control system according to claim 1, wherein the state information comprises vehicle identification information, vehicle speed, vehicle position information and vehicle pose information, and the vehicle state sensor comprises:
   a code transmitter, configured to collect the vehicle identification information;
   a vehicle speed sensor, configured to collect the vehicle speed;
   a positioning device, configured to collect the vehicle position information; and
   a vehicle pose sensor, configured to collect the vehicle pose information.

4. The vehicle control system according to claim 1, wherein the first road environment information comprises road terrain information, vehicle identification information, vehicle position information and vehicle video information, and the environment sensor further comprises:
   a first terrain scanner, arranged on the fixed rod and configured to collect the road terrain information;
   a code collector, arranged on the fixed rod and configured to collect the vehicle identification information; and
   a first video collector, arranged on the fixed rod and configured to collect the vehicle video information.

5. The vehicle control system according to claim 1, wherein the second road environment information comprises road terrain information and vehicle video information, the UAV scanner includes:
   a second terrain scanner, configured to collect the road terrain information; and
   a second video collector, configured to collect the vehicle video information.

6. A vehicle control method applied to the vehicle control system according to claim 1, comprising:
   controlling a vehicle state sensor to collect state information of a vehicle and send the state information to a central data processor;
   controlling an environment sensor to collect first road environment information of the vehicle and send the first road environment information to the central data processor;
   controlling a UAV scanner to collect second road environment information of the vehicle and send the second road environment information to the central data processor;
   controlling the central data processor to generate fusion information according to the state information, the first road environment information and the second road environment information, and send the fusion information to a map processor and a vehicle dispatch controller;
   controlling the map processor to generate a driving route map of the vehicle according to the fusion information;
   controlling the vehicle dispatch controller to generate a control instruction according to the fusion information and the driving route map, and send the control instruction to an on-board controller; and
   controlling the on-board controller to control driving of the vehicle according to the control instruction.

7. The vehicle control method according to claim 6, further comprising:
   controlling the map processor to update the driving route map according to updated fusion information.

8. The vehicle control method according to claim 6, further comprising:
   controlling the central data processor to send obstacle information to the vehicle dispatch controller, when it is determined that there is an obstacle on a road according to the first road environment information and/or the second road environment information; and
   controlling the vehicle dispatch controller to update the control instruction according to the obstacle information.

9. The vehicle control method according to claim 6, further comprising:
   controlling the vehicle dispatch controller to display the fusion information.

10. The vehicle control method according to claim 6, wherein controlling the UAV scanner to collect the second road environment information of the vehicle comprises: controlling the UAV scanner to periodically collect the second road environment information of the vehicle.

\* \* \* \* \*